United States Patent
De Graaf et al.

(10) Patent No.: US 6,549,111 B1
(45) Date of Patent: Apr. 15, 2003

(54) INDUCTIVE ELEMENT

(75) Inventors: Martinus J. M. De Graaf, Eindhoven (NL); Eelco G. Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/858,725

(22) Filed: May 16, 2001

Related U.S. Application Data

(63) Continuation of application No. 09/307,158, filed on May 7, 1999, now Pat. No. 6,259,345.

(30) Foreign Application Priority Data

May 8, 1998 (EP) .............................................. 98201463

(51) Int. Cl.⁷ .............................................. H01F 27/29
(52) U.S. Cl. ........................... 336/192; 336/90; 336/96; 336/83
(58) Field of Search ........................... 336/192, 96, 90, 336/83; 29/602.1

(56) References Cited

U.S. PATENT DOCUMENTS

| | | | | |
|---|---|---|---|---|
| 4,431,979 A | * | 2/1984 | Stijntjes et al. ............. | 335/210 |
| 4,680,617 A | * | 7/1987 | Ross .......................... | 257/795 |
| 4,872,825 A | * | 10/1989 | Ross .......................... | 425/117 |
| 5,568,111 A | * | 10/1996 | Metsler ........................ | 336/65 |

* cited by examiner

*Primary Examiner*—Anh Mai
(74) *Attorney, Agent, or Firm*—Aaron Waxler

(57) ABSTRACT

A description is given of a method of manufacturing an inductive element for SMD applications. This method comprises the following steps: a) providing a number of predominantly parallel electroconductive wires in the mould of an injection-molding device, b) circumferentially providing a part of the wires with a synthetic resin by injection molding, in such a manner that the ends of the wires remain free, c) providing an envelope of a soft-magnetic material around the circumferentially injection molded part of the wires, and d) reshaping the ends of the wires. In accordance with the invention, the method is characterized in that the parts of the wires to be circumferentially injection molded are fixed inside the mold during the injection molding process. It has been found that inductive elements of the type manufactured in accordance with the inventive method generate, in operation, optimally homogeneous magnetic fields. Also the risk of electric short-circuits proves to be small.

2 Claims, 2 Drawing Sheets

INDUCTIVE ELEMENT

This application is a continuation of Ser. No. 09/307,158 filed May 7, 1999 now U.S. Pat. No. 6,259,345.

The invention relates to a method of manufacturing an inductive element for SMD applications, which method includes the following steps:

a) providing a number of predominantly parallel electroconductive wires in the mould of an injection-moulding device, b) circumferentially providing a part of the wires with a synthetic resin by injection moulding, in such a manner that the ends of the wires remain free, c) providing an envelope of a soft-magnetic material around the circumferentially injection moulded part of the wires.

The invention also relates to an inductive element. The term inductive elements includes inter alia inductors, such as in particular power inductors, and inductance coils, as well as transformers, such as in particular power transformers.

BACKGROUND OF THE INVENTION

It has been found that in practice the inductive elements manufactured in accordance with the above-mentioned method give rise to problems. For example, in the case of mass-produced inductive elements, the electrical and magnetic properties of the elements vary to an undesirable extent. It has been found that the magnetic fields, which are generated during operation of these elements, are not optimally homogeneous. It has also been found that sometimes an electric short-circuit occurs in these elements. These drawbacks increase as the thickness or diameter of the wires is chosen to be smaller.

SUMMARY OF THE INVENTION

It is an object of the invention to obviate the above-mentioned drawbacks. The invention more particularly aims at providing a method which enables inductive elements having improved electrical and magnetic properties to be manufactured. The invention also aims at providing an improved inductive element.

These and other objects of the invention are achieved by a method of the type mentioned in the opening paragraph, which is characterized in that the parts of the wires to be circumferentially injection moulded are secured in the mould during said injection moulding operation.

The invention is based on the experimentally gained insight that deformation of the wire during the injection-moulding process is responsible for said drawbacks. This deformation is caused by the force with which the synthetic resin is squirted into the mould. Said undesirable deformation is substantially reduced, and sometimes even precluded, by securing the wires in the mould during the injection-moulding process.

A preferred embodiment of the invention is characterized in that the injection-moulding device is provided with means for securing the wires in the mould. It is noted that, in principle it is also possible to connect the wires to each other, for example by means of a piece of adhesive tape. However, this possibility requires an additional process step, namely the provision of the adhesive tape. In addition, it has been found that this solution is less satisfactory when synthetic resins are used which are squirted into the mould at a high temperature.

A further preferred embodiment is characterized in that the means comprise at least one pair of elongated parts, which are provided in the mould and between which the wires are clamped. These parts may, for example, be embodied so as to be in the form of knives which, when the mould portions are closed, rest on the wires in a clamping manner. If one pair of this type of knives is used, the knives are preferably arranged in the mould in such a manner that approximately the center of the part of the wires to be circumferentially injection moulded is engaged in a clamping manner.

A more refined modification of the last-mentioned embodiment of the method is characterized in accordance with the invention in that the means comprise at least two pairs of elongated parts, which are provided with teeth between which the wires are held, which teeth are distributed over said parts in such a manner that adjoining wires are not held by the same pair of parts. As a result of this measure, the creepage distance between adjoining wires is larger than in the last-mentioned embodiment. Consequently, the risk of problems caused by a short-circuit due to moisture is reduced.

Another interesting embodiment of the method is characterized in that the wires form part of a lead frame whose transport strips are removed. The use of lead frames simplifies the positioning of the wires in the mould of the injection-moulding device. Preferably, the wires are also connected to the adjoining wire or wires at the location where the parts of the injection-moulding device rest on the wires during the injection-moulding process. This precludes injection-moulding material from being squeezed out. These connections (also referred to as "dam bars") must be interrupted after the synthetic resin has been provided.

Another favorable embodiment of the method in accordance with the invention is characterized in that a thermoplastic synthetic resin is circumferentially provided on the wires by injection moulding. It is noted that, in principle, a thermo-curing synthetic resin may alternatively be used. However, due to the necessary, relatively long curing times of customary thermo-curing synthetic resins, they are less attractive for use in mass-production. Preferably, use is made of a thermoplastic synthetic resin based on liquid-crystalline polymers. Said polymers can be readily injection moulded and have relatively good flame-extinguishing properties.

The invention also relates to an inductive element which comprises a number of predominantly parallel electroconductive wires which are partly circumferentially provided with a synthetic resin by injection moulding, the injection moulded part of the wires being accommodated in a block-shaped, undivided core of a soft-magnetic material. Preferably, a thermoplastic synthetic resin is used. If an undivided core (i.e. without connection surfaces) is used, then the homogeneity of the magnetic field generated during operation of the inductive element is optimal. Preferably, the core is predominantly composed of a soft-magnetic ferrite material. Very suitable ferrite materials include MnZn and NiZn ferrite materials.

These and other aspects of the invention will be apparent from and elucidated with reference to the embodiments described hereinafter.

BRIEF DESCRIPTION OF THE DRAWING

In the drawings.

It is noted that, for clarity, the Figures are not drawn to scale. Like reference numerals in different Figures refer to like elements in these Figures.

DETAILED DESCRIPTION OF THE PRIMARY EMBODIMENT

Figure 1:
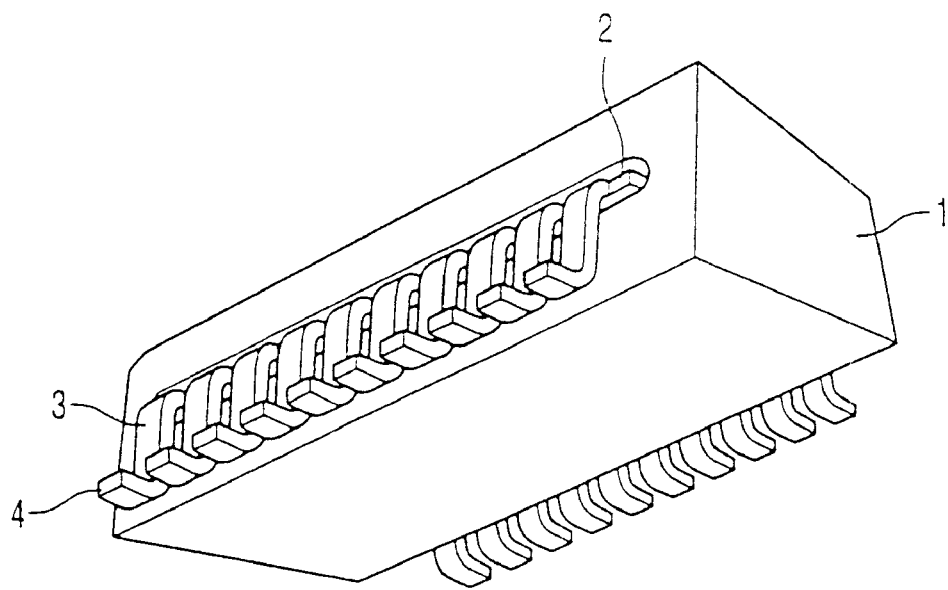
FIG. 1 is an elevational view of an inductive element in accordance with the invention.

FIG. 1 shows an elevational view of an inductive element in the form of an inductor. This inductive element comprises a block-shaped, undivided core (1) of a soft-magnetic ferrite material, which in this case consists of MnZn-ferrite. Said core 1 comprises a through-hole (2) through which ten wires (3) of tin-plated copper are passed. These wires are bent at their end portions (4) in such a manner that the inductive element can be soldered as an SMD-component onto a printed circuit board (PCB). By means of an injection-moulding process, the wires are partly circumferentially covered with an electrically insulating synthetic resin, which in this case consists of a thermoplastic synthetic resin on the basis of liquid-crystalline polymers.

Figure 2:
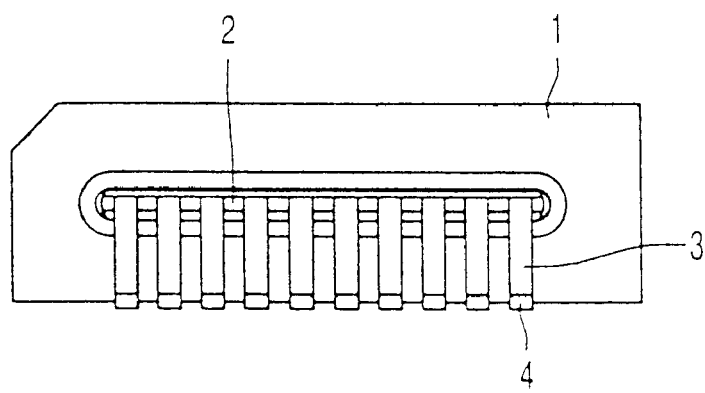
FIG. 2 is a schematic, longitudinal sectional view of the inductive element shown in FIG. 1.

FIG. 2 is a schematic, longitudinal sectional view of the inductive element shown in FIG. 1.

Figure 3A:
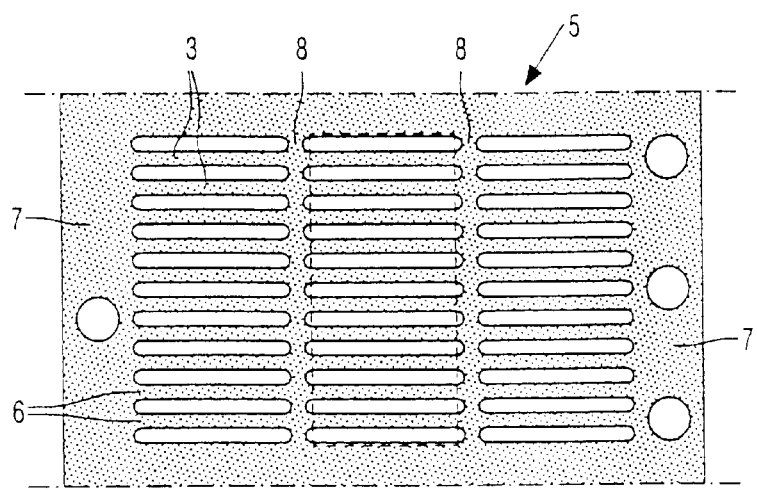
FIG. 3 shows a number of intermediate products obtained by means of the method in accordance with the invention.
Figure 3B:
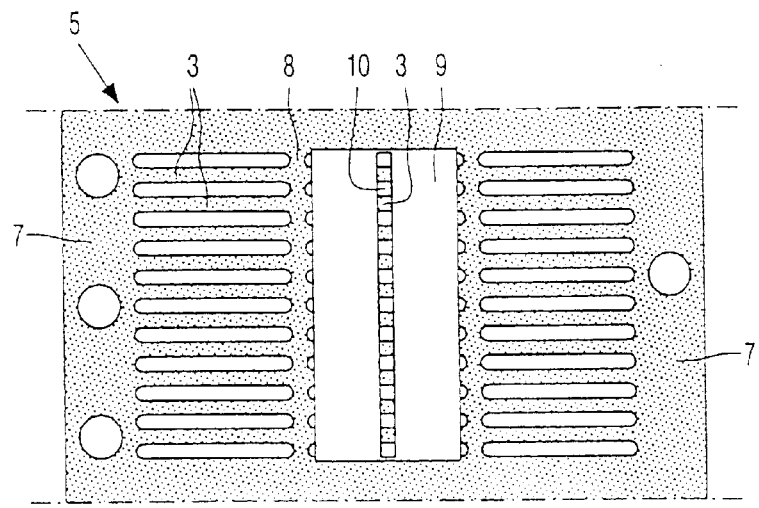
Figure 3C:
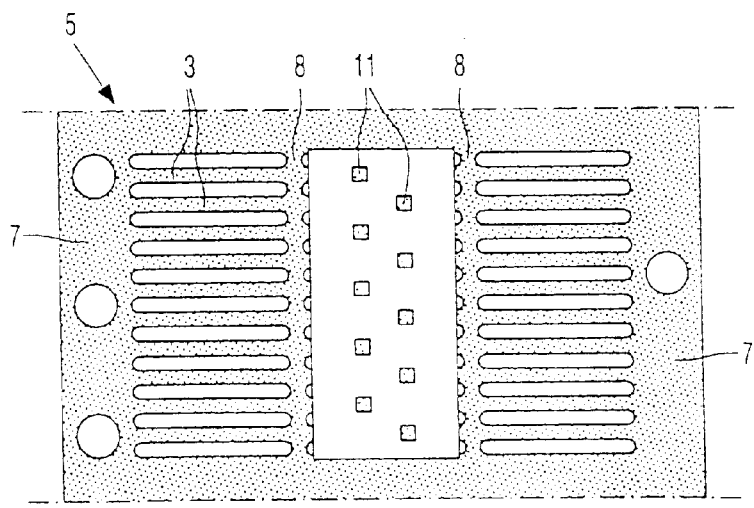

The method in accordance with the invention is explained in greater detail by means of FIGS. 3-A, 3-B and 3-C. FIG. 3-A shows a part of a lead frame (5) of tin-plated copper, which comprises ten substantially parallel wires (3) which are provided in the lead frame. The wires are connected at their ends (6) to the transport strips (7) of the lead frame (5). In accordance with the embodiment shown, the wires (3) are also connected, at locations (8), to adjacent wires, the so-called "dam bars". A lead frame comprises a large number of these wire structures as shown in FIG. 3-A.

The substantially parallel wires (3) are subsequently introduced into the mould of an injection-moulding device (not shown). The part of the wires to be circumferentially injection moulded is bounded by said "dam bars" (8). By virtue of the presence of these dam bars, the injection-moulding material is not extruded between the wires.

The mould of the injection-moulding device comprises means for securing the wires during the injection-moulding process. These means, in their simplest form, consist of two knives connected to the mould, between which the wires are clamped substantially in the middle. FIG. 3-B is a plan view of the lead frame after a part of the wires has been circumferentially injection moulded in accordance with the method of the invention. In this method, a layer (9) of a synthetic resin is provided which extends as far as the "dam bars" (8). Due to the presence of the knives, a channel (10) is formed in the layer (9), in which the wires (3) can be readily recognized.

Subsequently, the "dam bars" (8) and the transport strips are removed from the lead frame. After the provision of a small amount of adhesive on one or both main surfaces of the circumferentially injection moulded synthetic resin material, an undivided, block-shaped envelope of a soft-magnetic ferrite material (MnZn-ferrite) is slid over the circumferentially injection moulded wires. Finally, the free ends of the wires are bent in such a manner that a so-called gulf-wing is formed, which renders the resultant inductive element suitable for use as an SMD-element.

In FIG. 3-C, an improved embodiment of the method in accordance with the invention is shown. The mould used for circumferentially injection moulding the wires comprises, in this case, two pairs of elongated parts for securing the wires. These parts are provided with teeth, which are distributed over the parts in such a manner that adjacent wires are not held by the same pair of parts. This method causes the creepage distance between adjoining wires to become longer. As a result, the risk of short-circuit problems during operation of the inductive element in moist conditions is small. The resultant circumferentially injection moulded structure is converted to an inductive element in the same manner as described hereinabove.

It has been found that inductive elements of the type manufactured in accordance with the inventive method generate, in operation, optimally homogeneous magnetic fields. Also the risk of electric short-circuits proves to be small.

What is claimed is:

1. An inductive element comprising a number of predominantly parallel electroconductive wires which are partly circumferentially provided with a synthetic resin by injection moulding, said injection-moulded part of said wires being accommodated in a block-shaped, undivided core of a soft-magnetic material.

2. The inductive element of claim 1, wherein said core is predominantly composed of a soft-magnetic ferrite material.

* * * * *